(12) United States Patent
Tanaka

(10) Patent No.: US 8,388,141 B2
(45) Date of Patent: Mar. 5, 2013

(54) ELECTRIC APPARATUS

(75) Inventor: Junichi Tanaka, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 861 days.

(21) Appl. No.: 12/362,955

(22) Filed: Jan. 30, 2009

(65) Prior Publication Data

US 2009/0200001 A1    Aug. 13, 2009

(30) Foreign Application Priority Data

Feb. 7, 2008    (JP) ................................. 2008-027707

(51) Int. Cl.
*G03B 21/18*    (2006.01)
(52) U.S. Cl. .............. 353/57; 165/121; 353/58; 353/59; 353/60; 353/61
(58) Field of Classification Search .............. 353/57–61; 165/121
See application file for complete search history.

(56) References Cited

U.S. PATENT DOCUMENTS

| | | | |
|---|---|---|---|
| 6,280,038 B1 * | 8/2001 | Fuse et al. ........................ | 353/57 |
| 6,871,960 B2 | 3/2005 | Kim | |
| 7,077,530 B2 * | 7/2006 | Chen et al. ..................... | 353/122 |
| 2007/0285623 A1 | 12/2007 | Kuraie | |

FOREIGN PATENT DOCUMENTS

| | | |
|---|---|---|
| GB | 706170 | 3/1954 |
| GB | 2088960 | 6/1982 |
| JP | 10-290551 | 10/1998 |
| JP | 2002-122839 A | 4/2002 |
| JP | 2004-151648 A | 5/2004 |
| JP | 2006-195359 A | 7/2006 |
| JP | 2006-308956 A | 11/2006 |
| JP | 2007-231890 A | 9/2007 |
| JP | 2007-285164 A | 11/2007 |
| WO | 2004/059174 A1 | 7/2004 |

* cited by examiner

*Primary Examiner* — Francis M LeGasse, Jr.
*Assistant Examiner* — Jerry Brooks
(74) *Attorney, Agent, or Firm* — Canon USA Inc IP Division

(57) ABSTRACT

An electric apparatus includes a centrifugal fan that includes an impeller in a casing, and is configured to draw air when the impeller rotates in the casing, and to have a blowoff channel of the air from the impeller in the casing, which spreads in a rotating direction of the impeller, and a first cooled part and a second cooled part that has a necessary cooling air capacity larger than that of the first cooled part, the first cooled part and the second cooled part being cooled by the air drawn by the centrifugal fan, wherein a drawing surface of the centrifugal fan has a first drawing area and a second drawing area that has a drawing speed higher than that of the first drawing area when the impeller rotates.

6 Claims, 9 Drawing Sheets

ELECTRIC APPARATUS

BACKGROUND OF THE INVENTION

1. Field of the Invention

The present invention relates to an electric apparatus configured to cool a cooled part by using a centrifugal fan.

2. Description of the Related Art

For size reduction and silent driving, some electric apparatuses use air drawn by a centrifugal fan, such as a sirocco fan (which will be referred to a "sirocco fan" hereinafter) to cool a cooled part. See Japanese Laid-Open Nos. 2002-122839 and 2004-151648. The sirocco fan is a fan that draws the air as a result of an impeller rotates in the casing, and an air blowoff channel from the impeller is formed in the casing so that the blowoff channel can spread in the rotating direction of the impeller.

However, the sirocco fan has a drawing speed distribution on its drawing surface due to the above casing's structure. When there is maintained a sufficient distance between the cooled part and the drawing surface of the sirocco fan the drawing speed distribution is little influential, but as the electric apparatus becomes smaller the cooled part may often be located near the drawing surface.

Unless the drawing surface of the sirocco fan is properly arranged to the necessary cooling air amount of the cooled part by taking the above drawing speed distribution into consideration, the cooling efficiency lowers to the cooled part and as the number of fan's rotations increases the noise increases accordingly.

An airflow control member can be added near the drawing surface so that the cooling wind can efficiently flow around the cooled part, but its arrangement is difficult due to the space limitation and the noise can increase. Moreover, a similar problem occurs when a large cooling assistance member, such as a heat sink, is arranged near the drawing surface in order to increase the cooling efficiency.

SUMMARY OF THE INVENTION

The present invention provides an electric apparatus that can efficiently cool a cooled part with reduced noises even when the cooled part is located near a drawing surface of a centrifugal fan.

An electric apparatus according to one aspect of the present invention includes a centrifugal fan that includes an impeller in a casing, and is configured to draw air when the impeller rotates in the casing, and to have a blowoff channel of the air from the impeller in the casing, which spreads in a rotating direction of the impeller, and a first cooled part and a second cooled part that has a necessary cooling air capacity larger than that of the first cooled part, the first cooled part and the second cooled part being cooled by the air drawn by the centrifugal fan, wherein a drawing surface of the centrifugal fan has a first drawing area and a second drawing area that has a drawing speed higher than that of the first drawing area when the impeller rotates, wherein the drawing surface faces the first and second cooled parts, and wherein the second drawing area is closer to the second cooled part than to the first cooled part.

Further features of the present invention will become apparent from the following description of exemplary embodiments with reference to the attached drawings.

DESCRIPTION OF THE EMBODIMENTS

Referring now to the accompanying drawings, a description will be given of one embodiment of the present invention.

Referring now to FIGS. 1, 3-9, a description will be given of a structure of a liquid crystal projector (image projection apparatus) as an electric apparatus according to one embodiment of the present invention. An overall description will now be given of the components in the projector that is commonly used for the first to third embodiments.

Figure 1:
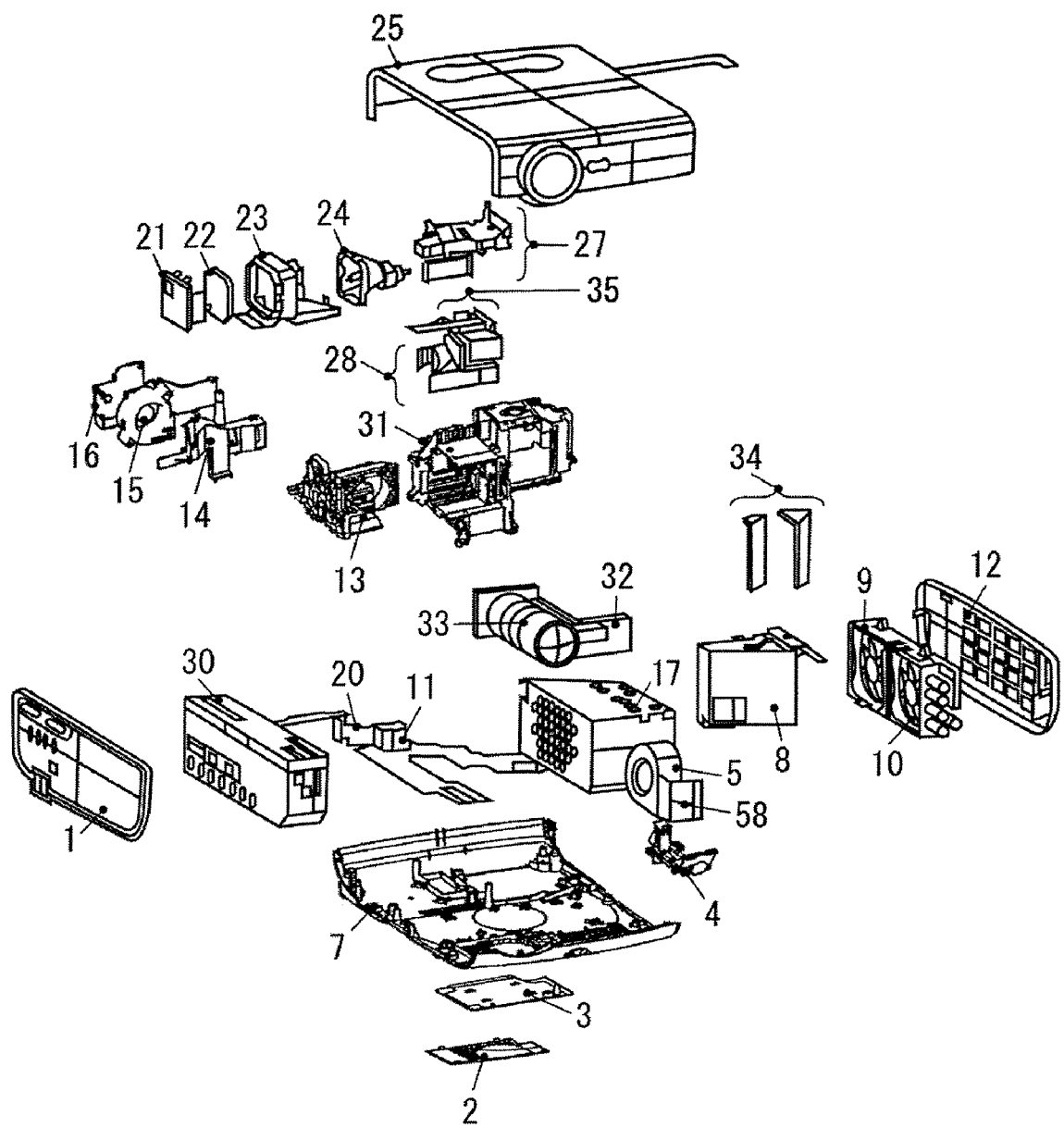
FIG. 1 is an exploded perspective view of a projector (image projection apparatus) according to one embodiment of the present invention.
Figure 3:
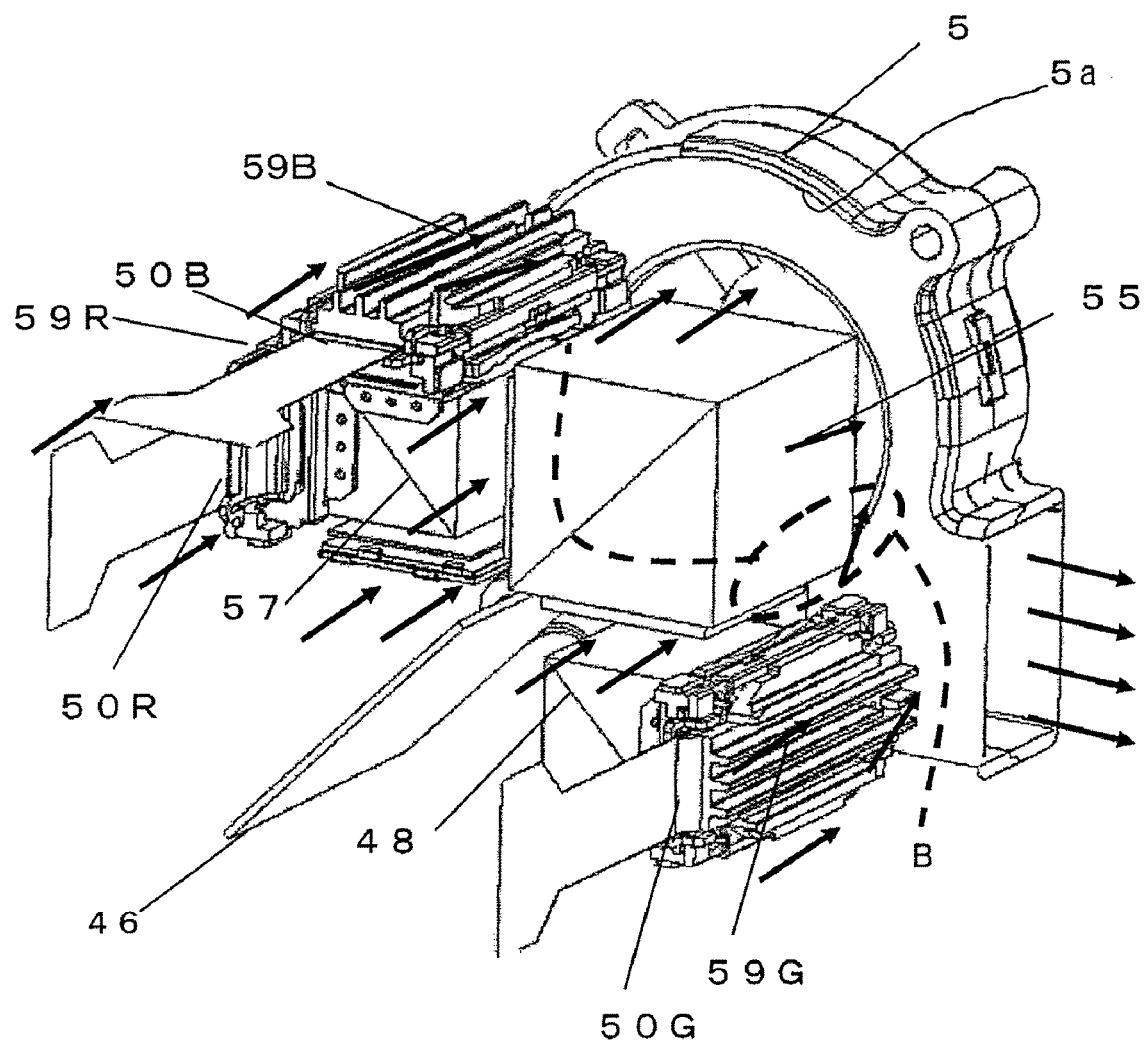
FIG. 3 shows an arrangement of a first embodiment of the present invention.
Figure 4:
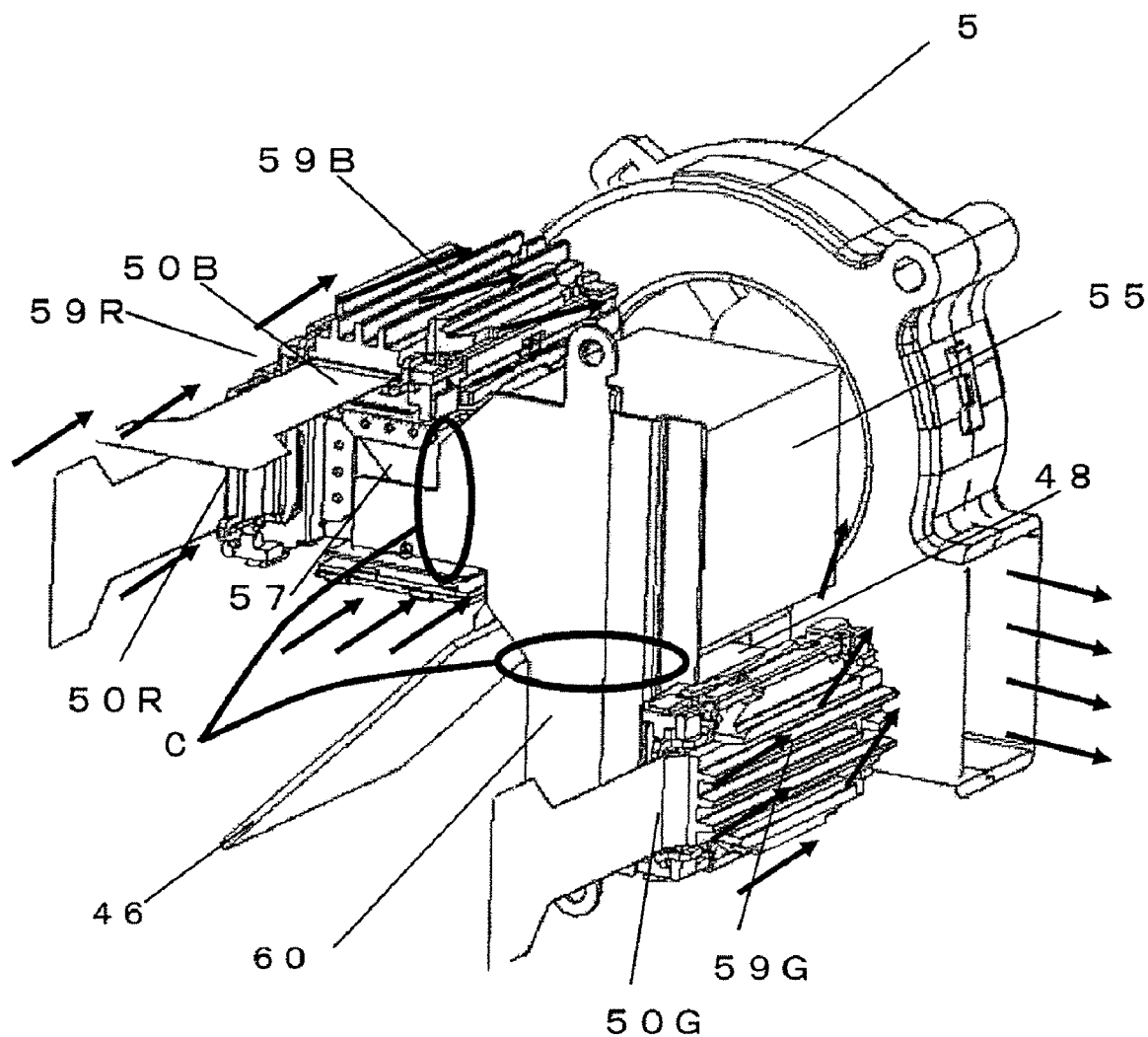
FIG. 4 shows the arrangement of the first embodiment of the present invention.
Figure 5:
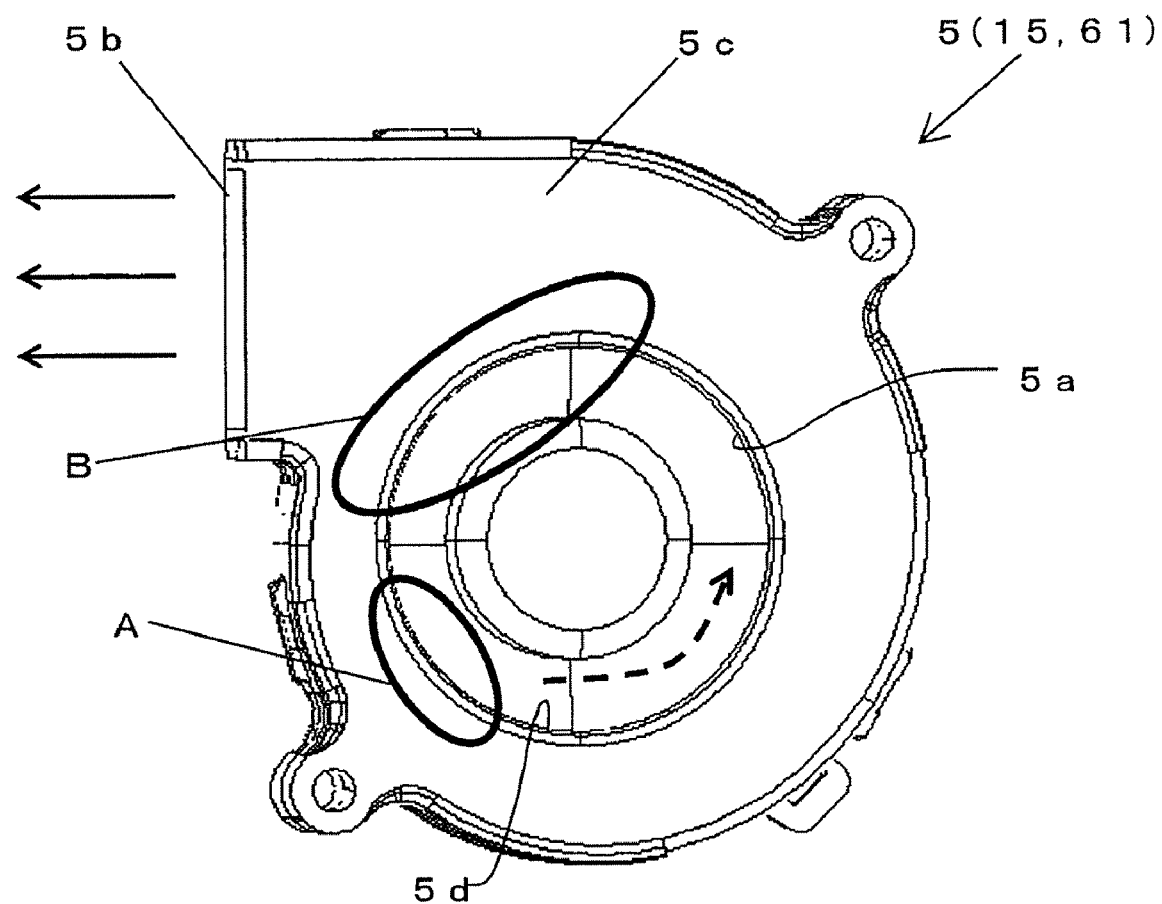
FIG. 5 is a view showing a centrifugal fan used for the embodiment of the present invention.
Figure 6:
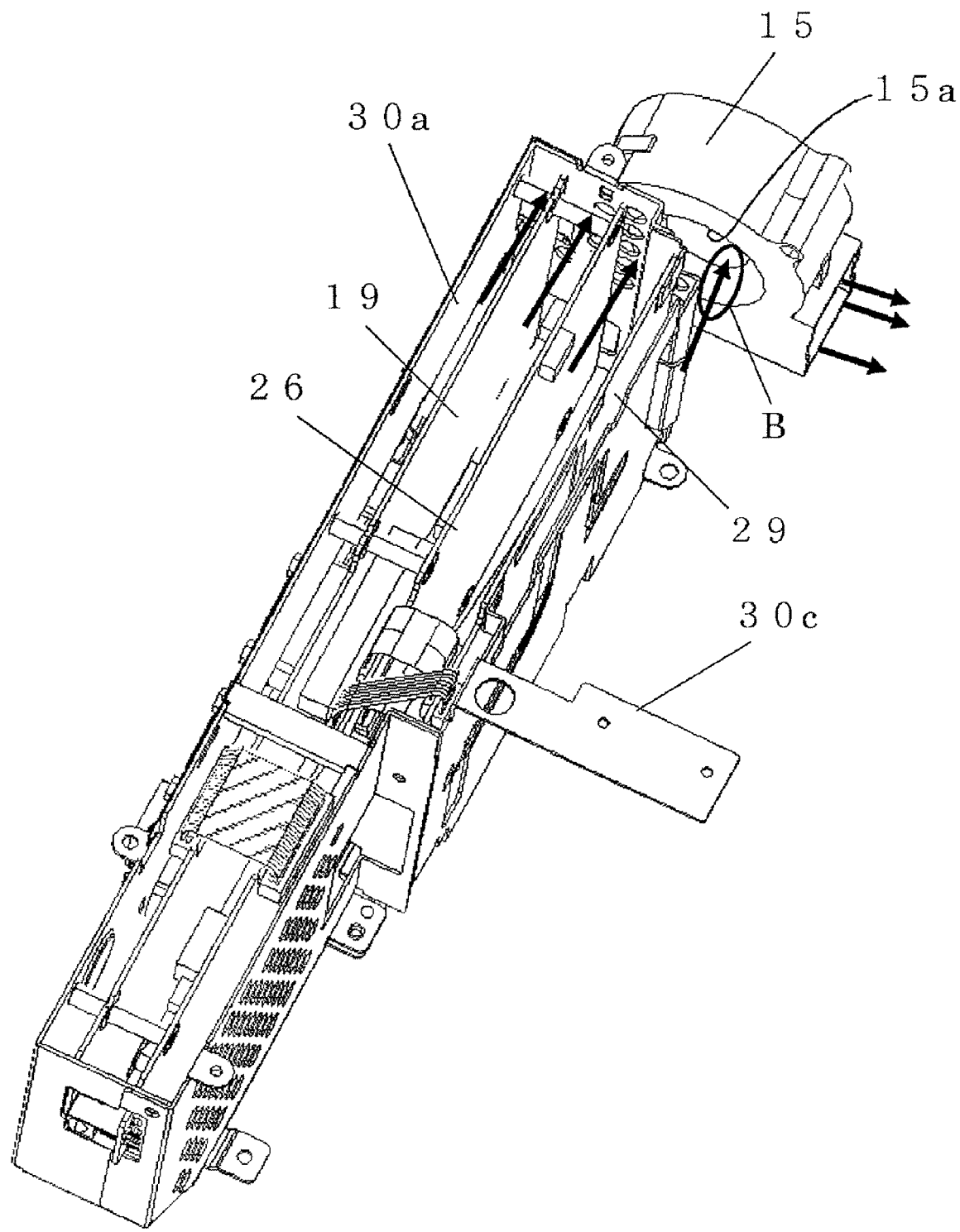
FIG. 6 shows an arrangement of a second embodiment of the present invention.
Figure 7:
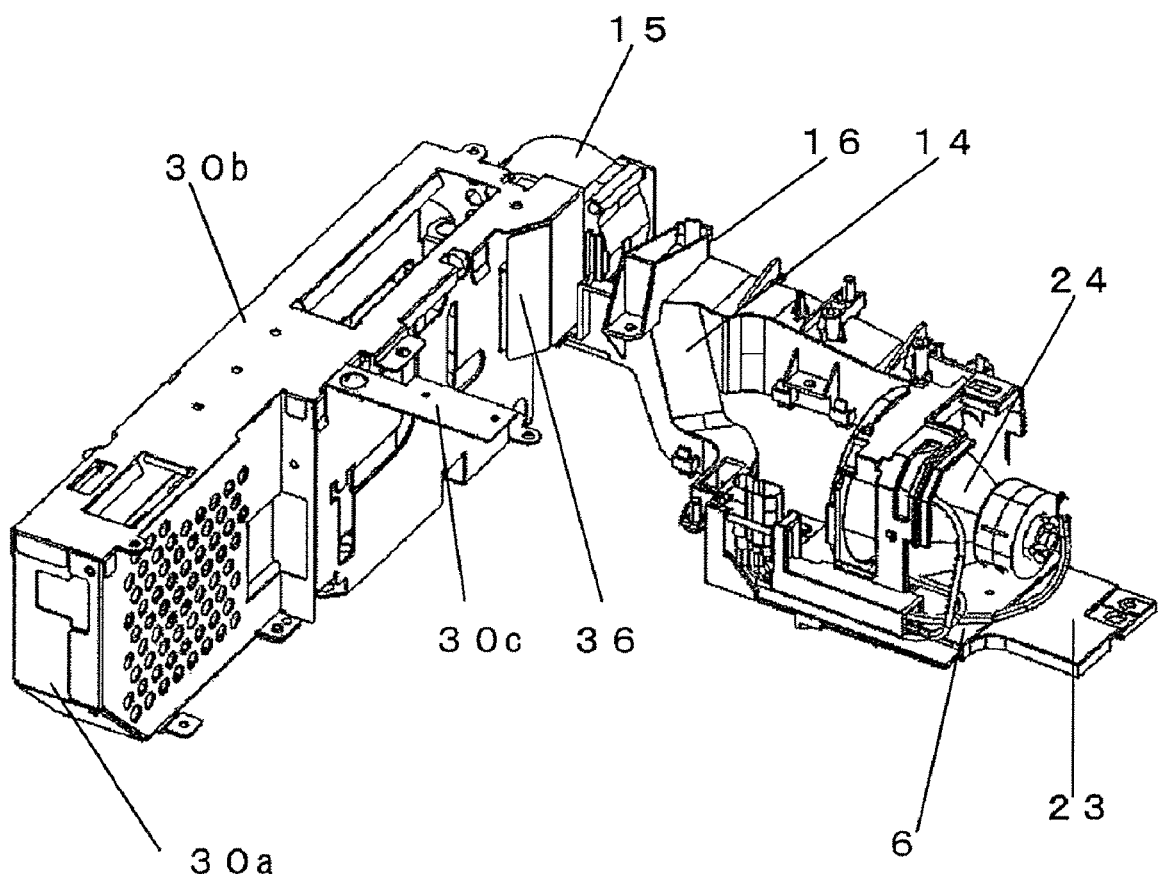
FIG. 7 shows the arrangement of the second embodiment of the present invention.
Figure 8:
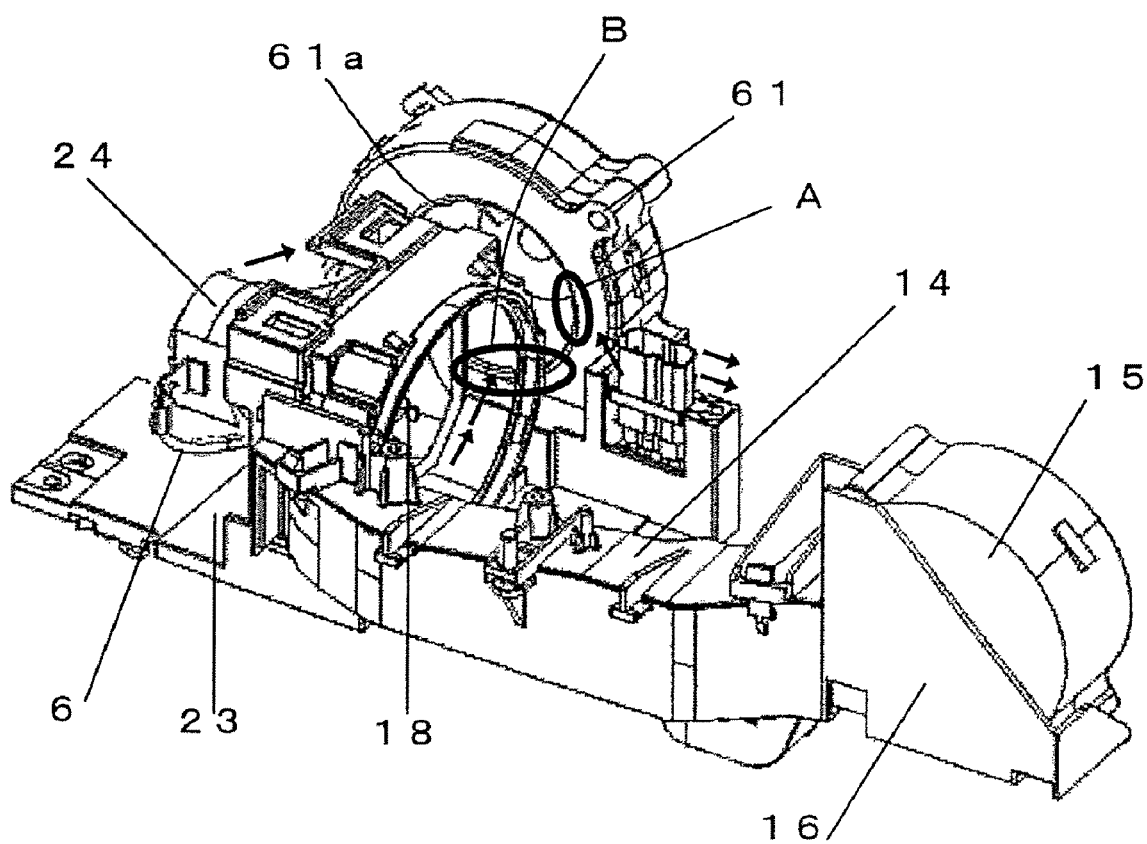
FIG. 8 shows an arrangement of a third embodiment of the present invention.
Figure 9:
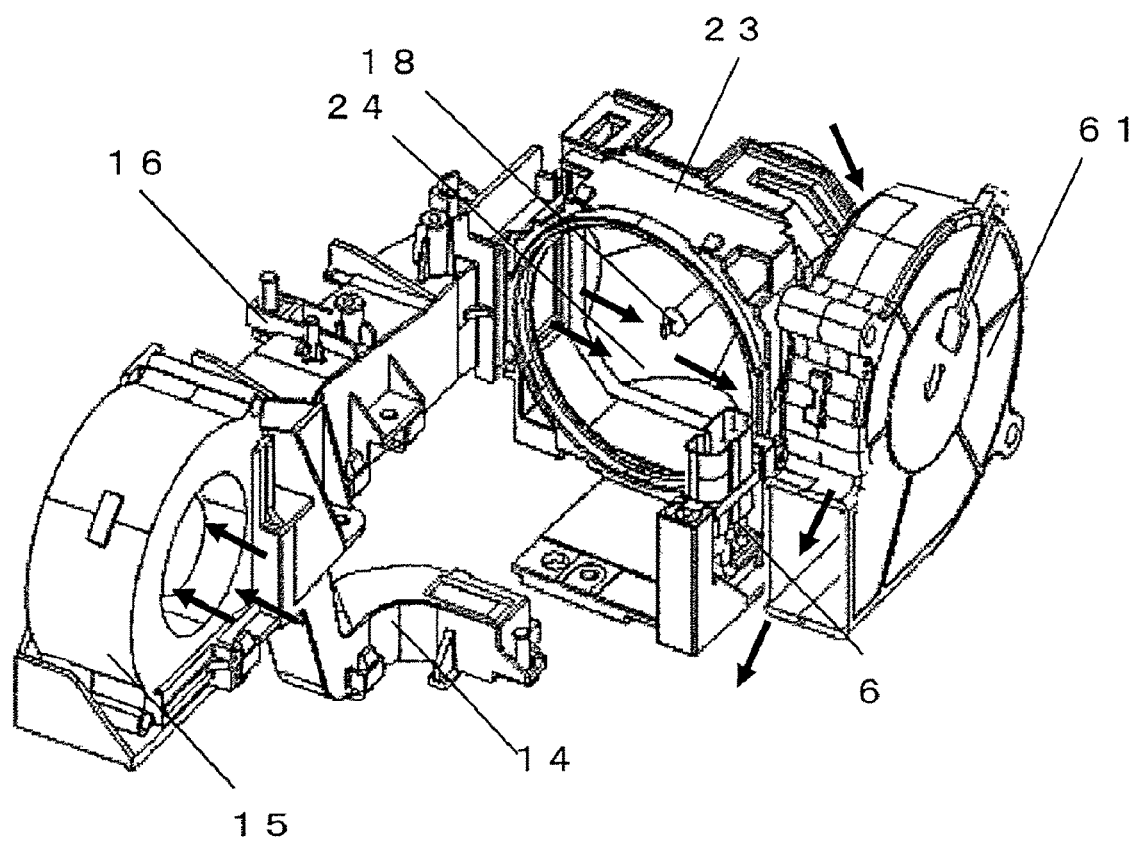
FIG. 9 shows the arrangement of the third embodiment of the present invention.

FIG. 1 shows an overall structure of the projector. FIGS. 3 and 4 show a cooling structure around a color separation/synthesis optical system in the projector. FIG. 5 shows a centrifugal fan used for the projector. FIG. 6 shows a structure of a substrate part in the projector. FIGS. 7-9 show a cooling structure around the lamp in the projector.

In these figures, 24 denotes a light source lamp (which will be simply referred to as a "lamp" hereinafter), and this embodiment uses a high-pressure mercury discharge lamp. The light source lamp 24 may use a discharge lamp other than the high-pressure mercury discharge lamp, such as a halogen lamp, a xenon lamp, a metal halide lamp.

23 denotes a lamp holder configured to hold the lamp 24. 22 denotes an explosion-proof glass. 21 denotes a glass press. 35 denotes an illumination optical system configured to convert a luminous flux from the lamp 24 into a parallel luminous flux having a uniform brightness distribution. 28 denotes a color separation/synthesis optical system configured to color-separate the light from the illumination optical system 35, to lead the separated light to each of the following liquid crystal panels for three colors of RGB, and to color-synthesize the light from the liquid crystal panels.

59R, 59G, and 59B shown in FIGS. 3 and 4 denote cooling assistance members configured to supplement cooling of the liquid crystal panel.

33 denotes a projection lens barrel configured to project the light (image) from the color separation/synthesis optical system 28 onto a screen (projected surface) (not shown). The following projection optical system is housed in the projection lens barrel 33.

60 shown in FIG. 4 denotes a fixture member onto which the color separation/synthesis optical system 28 is fixed. The fixture member 60 also serves as a member configured to limit a cooling air duct around the color separation/synthesis optical system 28.

31 denotes an optical box configured to house the lamp 24, the illumination optical system 35, and color separation/synthesis optical system 28, and the projection lens barrel 33 is fixed onto the optical box 31. The optical box 31 has a lamp case part that encloses the surrounding of the lamp 24. A top opening of the optical box 31 is covered with an optical box lid 27, while the optical box 31 houses the illumination optical system 35 and color separation/synthesis optical system 28.

61 shown in FIGS. 8 and 9 denotes a second lamp cooling fan configured to cool the lamp 24.

17 denotes a power source cover member configured to cover a power source unit (not shown) and a light source driving unit (not shown). 20 denotes a metallic member that constitutes part of the power source cover member 17, and is electrically connected to a ground terminal of the power source.

In FIG. 6, 26 denotes a control substrate configured to control each component in the projector with power from the power source unit. 29 denotes a panel driving substrate (modulation element driving substrate) configured to drive the liquid crystal panel in accordance with the video signal, and make the liquid crystal panel form an image corresponding to a video signal. 19 denotes a signal receiving substrate having a connector that receives a signal from the outside of the projector. These electric circuit substrates 26, 29, and 19 are covered by the circuit substrate cover member 30. The circuit substrate cover member 30 includes three components, i.e., first to third cover members 30a, 30b, and 30c, as shown in FIGS. 6 and 7.

In FIG. 7, 36 denotes an air duct part integrated with the second cover member 30b and configured to efficiently lead the cooling wind to the following first lamp cooling fan 15.

5 denotes a panel cooling fan located near the central part in the projector and configured to cool an optical element, such as the liquid crystal panel in the color separation/synthesis optical system 28, by using the drawn wind, and to cool the power source unit and the power source driving unit by using the blowoff wind. The panel cooling fan 5 is a sirocco fan that is one type of a centrifugal fan. 58 denotes an air duct configured to lead a blowoff wind from the panel cooling fan 5 to the power source unit and light source driving unit.

14 denotes a first lamp duct configured to hold the first lamp cooling fan 15, and to supply the cooling wind from the first lamp cooling fan 15 to the lamp 24. 16 denotes a second lamp duct configured to hold the first lamp cooling fan 15, and to form a duct together with the first lamp duct 14.

10 denotes a power source cooling fan configured to draw air from an inlet port provided in a bottom panel 7 of the case, which will be described later, to circulate the wind in the power source unit and the light source driving unit, and to cool these components. 9 denotes an exhaust fan configured to exhaust to the outside of the projector the hot wind that has been blown on the lamp 24 by the first lamp cooling fan 15 and has passed the lamp 24.

34 denotes a lamp exhaust louver having a light shielding function that prevents a leakage of the light from the lamp 24 to the outside of the projector. 18 shown in FIGS. 8 and 9 denote a discharge tube that constitutes the lamp 24. 6 shown in FIGS. 7-9 denotes a lamp cord that extends from the lamp 24 and supplies lighting power to the discharge tube 18.

7 denotes the bottom panel of the case, which houses the lamp 24, the optical box 31, the power source unit, the light source driving unit, the circuit substrate cover member 30, cooling fans 5, 15, and 61, and the exhaust fan 9. 25 is a top panel of the case, which covers the bottom panel 7 while the bottom panel 7 houses the optical box 31. 1 denotes a first side plate, and 12 denotes a second side plate. These side plates 1 and 12 close the openings formed at both side surfaces of the bottom and top panels 7 and 25. The second side plate 12 has an exhaust port opposite to the exhaust fan 9.

The bottom panel 7, the top panel 25, the first side plate 1, and the second side plate 12 form the housing of the projector.

8 denotes an exhaust box configured to lead the hot wind that has cooled the lamp 24 to the exhaust fan 9 and to prevent diffusions of the hot wind in the housing.

3 denotes a lamp lid, which is detachably attached to a bottom surface of the bottom panel 7, and fixed onto the bottom panel 7 during the attachment by screws. 4 denotes a set adjustment leg. The set adjustment leg 4 is fixed onto the bottom panel 7, and a height of its leg part is adjustable. An inclination angle of the projector can be adjusted by the height adjustment of the leg part.

2 denotes a RGB inhalation plate configured to hold a filter (not shown) that covers the inlet port of the bottom panel 7. 13 denotes a prism base configured to hold the color separation/synthesis optical system 28.

11 denotes an external power receptacle, to which the external power source, such as a commercial power source, is connected. 32 denotes a remote controller sensor substrate, which provides an operation of the projector by the remote control.

Figure 2:
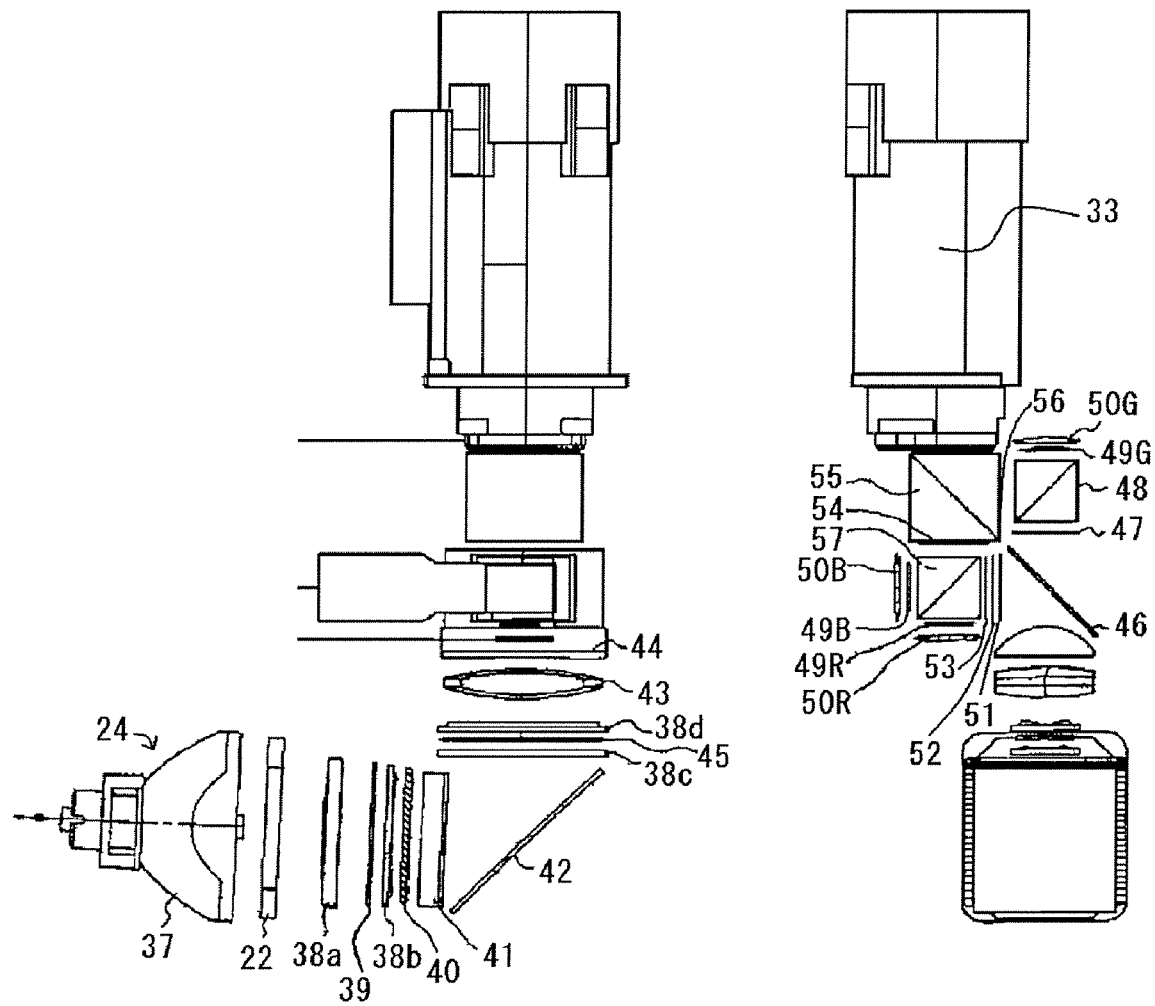
FIG. 2 is a plane view and a side view showing an optical structure of the projector according to the embodiment of the present invention.

Referring now to FIG. 2, a description will be given of the optical structure of the projector. FIGS. 3 and 4 also show some of the components shown in FIG. 2. In FIG. 2, the left side is a horizontal section, and the right side is a perpendicular section.

In these figures, 24 denotes a lamp configured to emit white light with a continuous spectrum, to condense the light from the discharge tube 18 shown in FIGS. 8 and 9 through the reflector 37 onto a predetermined direction, and to emit the light.

38a denotes a first cylinder array which arranges a plurality of cylindrical lens cells each having a refractive index in the horizontal direction. 38b denotes a second cylinder array which arranges a plurality of cylindrical lens cells corresponding to individual lens cells in the first cylinder array 38a.

39 denotes a ultraviolet absorption filter, and 40 denotes a polarization conversion element configured to convert non-polarized light into predetermined polarized light.

41 denotes a front compressor that includes a cylindrical lens having a refractive index in the perpendicular direction. 42 denotes a mirror configured to deflect an optical axis from the lamp 24 by about 90° (more specifically 88°).

38c is a third cylinder array that arranges a plurality of cylindrical lens cells each having a refractive index in the perpendicular direction. 38d is a fourth cylinder array having a plurality of cylindrical arrays corresponding to individual lens cells in the third cylinder array 38c.

45 denotes a color filter that returns the light having a specific wavelength region to the lamp 24 so as to adjust the color coordinate to a predetermined value. 43 denotes a condenser lens. 44 denotes a rear compressor that includes a cylindrical lens having a refractive index in the perpendicular direction. The above components constitute the illumination optical system 35.

46 denotes a dichroic mirror configured to reflect light having wavelength regions of blue (B: for example, 430 to 495 nm) and red (R: for example, 590 to 650 nm), and to transmit light having a wavelength region of green (G: 505 to 580 nm). 47 denotes a G-use incident side polarization plate that is made by adhering a polarization element to a transparent substrate, and transmits only the P-polarized light. 48 denotes a first polarization beam splitter configured to transmit the P-polarized light and to reflect the S-polarized light through the polarization separation surface that is made of a multilayer film.

50R, 50G, and 50B are a red-use reflective liquid crystal panel, a green-use reflective liquid crystal panel, a blue-use reflective liquid crystal panel each configured to reflect the incident light and to serve as a light modulation element (or image forming element) for image modulations.

49R, 49G, and 49B are a red-use quarter waveplate, a green-use quarter waveplate, and a blue-use quarter waveplate.

51 denotes a trimming filter configured to return orange light to the lamp 24 so as to improve the color purity of the R light. 52 denotes a RB-use incident side polarization plate made by adhering a polarization element to a transparent substrate. The RB-use incident side polarization plate 52 transmits only the P-polarized light.

53 denotes a color selective phase difference plate that converts a polarization direction of the R light by 90°, and maintains a polarization direction of the B light. 57 denotes a second polarization beam splitter configured to transmit the P-polarized light and to reflect the S-polarized light on the polarization separation surface.

54 denotes a B-use exit side polarization plate (polarization element) configured to rectify only the S-polarized light component in the B light. 56 denotes a G-use exit side polarization plate configured to transmit the S-polarized light component in the G light. 55 denotes a dichroic prism configured to transmit the R light and B light and to reflect the G light.

The above components including the dichroic mirror 46 to the dichroic prism 55 constitute the color separation/synthesis optical system 28.

In this embodiment, the polarization conversion element 40 converts the P-polarized light into the S-polarized light, but the "P-polarized light" and the "S-polarized light," as used herein, are defined on the basis of the light polarization direction in the polarization conversion element 40. On the other hand, the light incident upon the dichroic mirror 46 is assumed to be the P-polarized light by considering the polarization directions at the first and second polarization beam splitters 48 and 57 to be a reference. In other words, this embodiment defines the light exited from the polarization conversion element 40 as the S-polarized light but defines the same S-polarized light as the P-polarized light when it is incident upon the dichroic mirror 46.

Next follows a description of an optical operation.

The light emitted from the discharge tube 18 is condensed onto a predetermined direction by the reflector 37. The reflector 37 has a paraboloidal concave mirror, and the light from the focus position of the paraboloid becomes a luminous flux parallel to the symmetrical axis of the paraboloid. Since the light source from the discharge tube 18 is not an ideal point light source but has a finite size, the condensed luminous flux contains many light components that are unparallel to the symmetrical axis of the paraboloid. The luminous flux is incident upon the first cylinder array 38a. The light flux incident upon the first cylinder array 38a is divided into a plurality of luminous fluxes corresponding to the number of cylinder lens cells, condensed, and become a plurality of stripe-shaped luminous fluxes that are arranged in the perpendicular direction. The plurality of split luminous fluxes form a plurality of light source images near the polarization conversion element 40 via the ultraviolet absorption filter 39 and the second cylinder array 38b.

The polarization conversion element 40 has a polarization separation surface, a reflection surface, and a half waveplate. A plurality of luminous fluxes are incident upon the polarization separation surface corresponding to their rows, and are divided into the transmitting P-polarized light component and the reflected S-polarized light component. The reflected S-polarized light component is reflected on the reflection surface, and exited in the same direction as the P-polarized light component. On the other hand, the P-polarized light component that has transmitted the polarization separation surface transmits the half waveplate, and is converted into the same polarization component as the S-polarized light component. Thus, a plurality luminous fluxes having the same polarization direction are emitted.

A plurality of polarization-converted luminous fluxes exit the polarization conversion element 40, then are compressed by the front compressor 41, are reflected on the mirror 42 by an angle of 88°, and are incident upon the third cylinder array 38c.

The luminous flux incident upon the third cylinder array 38c is split into a plurality of luminous fluxes corresponding to the number of cylinder lens cells, condensed, and converted into a plurality of stripe-shaped luminous fluxes that are arranged in the horizontal direction. The plural split luminous fluxes are incident upon the rear compressor 44 via the fourth cylinder array 38d and the condenser lens 43.

Due to the optical operations of the front compressor 41, the condenser lens 43, and the rear compressor 44, rectangular images formed by the plural luminous fluxes overlap each other, and form a rectangular illumination area having a uniform brightness. The reflective liquid crystal panels 50R, 50G, and 50B are arranged in this illumination area.

The light that has been converted into the S-polarized light by the polarization conversion element 40 is incident upon the dichroic mirror 46. A description will now be given of an optical path of the G light that has passed the dichroic mirror 46.

The G light that has transmitted the dichroic mirror 46 is incident upon the incident side polarization plate 47. The G light has become the P-polarized light (or S-polarized light when the polarization conversion element 40 is used as a reference) even after separated by the dichroic mirror 46. The G light is exited from the incident side polarization plate 47, then is incident as the P-polarized light upon the first polarization beam splitter 48, transmits the polarization separation surface, and goes to the G-use reflective liquid crystal panel 50G.

An image supply apparatus (not shown), such as a personal computer, a DVD player, and a TV tuner, is connected to the projector. The panel driving substrate 29 drives the reflective liquid crystal panels 50R, 50G, and 50B based on the image information input from the image supply apparatus, and makes each of them form an original image for each color. Thereby, the luminous flux incident upon each reflective liquid crystal panel is reflected and (image-)modulated in accordance with the original image. The image supply apparatus and the projector constitute an image display system.

The G-use reflective liquid crystal panel 50G image-modulates and reflects the G-light. The P-polarized light component in the image-modulated G light again transmits the polarization separation surface of the first polarization beam splitter 48, is returned to the light source side, and is removed from the projection light. On the other hand, the S-polarized light component in the image-modulated G light is reflected on the polarization separation surface of the first polarization beam splitter 48, and goes as the projection light to the dichroic prism 55.

In this case, when all the polarized light components are converted into the P-polarized light components (or in a black display state), a slow axis of a quarter waveplate 49G is adjusted to a predetermined direction which is provided between the first polarization beam splitter 48 and the G-use reflective liquid crystal panel 50G. This configuration can reduce the influence of a disturbance of the polarization state that occurs in the first polarization beam splitter 48 and the G-use reflective liquid crystal panel 50G.

The G light emitted from the first polarization beam splitter 48 is incident as the S-polarization light upon the dichroic prism 55, is reflected on the dichroic film surface of the dichroic prism 55, and goes to the projection lens barrel 33 (projection optical system).

On the other hand, the R light and the B light reflected on the dichroic mirror 46 are incident upon the trimming filter 51. Each of the R light and the B light is the P-polarized light even after separated by the dichroic mirror 46. After the orange light component of each of the R light and the B light is cut by the trimming filter, the R light and the B light transmit the incident side polarization plate 52, and are incident upon the color selective phase difference plate 53.

The color selective phase difference plate 53 serves to rotate a polarization direction of only the R light by 90°, and thereby the R light is incident as the S-polarized light and the B light is incident as the P-polarized light upon the second polarization beam splitter 57.

The R light that is incident as the S-polarized light upon the second polarization beam splitter 57 is reflected on the polarization separation surface of the second polarization beam splitter 57, and goes to the R-use reflective liquid crystal panel 50R. In addition, the B light incident as the P-polarized light upon the second polarization beam splitter 57 transmits the polarization separation surface of the second polarization beam splitter 57, and goes to the B-use reflective liquid crystal panel 50B.

The R light incident upon the R-use reflective liquid crystal panel 50R is image-modulated and reflected. The S-polarized light component in the image-modulated R light is again reflected on the polarization separation surface of the second polarization beam splitter 57, returned to the light source side, and removed from the projection light. On the other hand, the P-polarized light component in the image-modulated R light transmits the polarization separation surface of the second polarization beam splitter 57, and goes to the dichroic prism 55 as the projection light.

In addition, the B light incident upon the B-use reflective liquid crystal panel 50B is image-modulated and reflected. The P-polarized light component in the image-modulated B light again transmits the polarization separation surface of the second polarization beam splitter 57, is returned to the light source side, and is removed from the projection light. On the other hand, the S-polarized light component in the image-modulated B light is reflected on the polarization separation surface of the second beam splitter 57, and goes as projection light to the dichroic prism 55.

At this time, by adjusting the slow axes of the quarter waveplates 49R and 49B provided between the second polarization beam splitter 57 and the R-use and B-use reflective liquid crystal panels 50R and 50B, the black display states of the R light and the B light can be adjusted, similar to the G light.

Thus, the B light in the R light and the B light that are synthesized into one luminous flux and exited from the second polarization beam splitter 57 is detected by the exit side polarization plate 54 and incident upon the dichroic prism 55. In addition, the R light transmits as the P-polarization light the exit side polarization plate 54, and is incident upon the dichroic prism 55.

By the detection at the exit side polarization plate 54, the B light becomes light from which an invalid component is cut, which is generated when the B light passes the second polarization beam splitter 57, the B-use reflective liquid crystal panel 50B, and the quarter waveplate 49B.

The R light and the B light that are incident upon the dichroic prism 55 transmit the dichroic film surface, is synthesized with the G light reflected on the dichroic film surface, and goes to the projection lens barrel 33.

The synthesized R light, G light, and B light are enlarged and projected on the projected surface, such as a screen, by the projection optical system in the projection lens barrel 33.

The above optical path is an optical path when the reflective liquid crystal panel is in the white display state. Next follows a description when the reflective liquid crystal panel is in the black display state.

A description will now be given of an optical path of the G light. The P-polarized light of the G light that has transmitted the dichroic mirror 46 is incident upon the incident side polarization plate 47, then incident upon the first polarization beam splitter 48, transmits its polarization separation surface, and goes to the G-use reflective liquid crystal panel 50G. However, the reflective liquid crystal panel 50G is in the black display state, and thus the G light is reflected without undergoing the image modulation. Therefore, even after reflected on the reflective liquid crystal panel 50G, the G light remains P-polarized. The G light again transmits the polarization separation surface of the first polarization beam splitter 48, transmits the incident side polarization plate 47, is returned to the light source side, and is removed from the projection light.

Next follows a description of optical paths of the R light and the B light. The P-polarized light of each of the R light and the B light reflected on the dichroic mirror 46 is incident upon the incident side polarization plate 52 through the trimming filter 51. After emitted from the incident side polarization plate 52, the G light is incident upon the color selective phase difference plate 53. Since the color selective phase difference plate 53 serves to rotate the polarization direction of only the R light by 90°, the R light is incident as the S-polarized light and the B light is incident as P-polarized light upon the second polarization beam splitter 57.

The R light that is incident as the S-polarized light upon the second polarization beam splitter 57 is reflected on its polarization separation surface, and goes to the R-use reflective liquid crystal panel 50R. In addition, the B light that is incident as the P-polarized light upon the second polarization beam splitter 57 transmits its polarization separation surface, and goes to the B-use reflective liquid crystal panel 50B.

Since the R-use reflective liquid crystal panel 50R is in the black display state, the R light incident upon the R-use reflective liquid crystal panel 50R is reflected without undergoing the image modulation. Therefore, after reflected on the R-use reflective liquid crystal panel 50R, the R light remains S-polarized. Thus, the R light is again reflected on the polarization separation surface of the second polarization beam splitter 57, transmits the incident side polarization plate 52, is returned to the light source side, and is removed from the projection light. Thereby, the black display is made.

On the other hand, the B light incident upon the B-use reflective liquid crystal panel 50B is reflected without undergoing image modulation, since the B-use reflective liquid crystal panel 50B is in the black display state. Therefore, after reflected on the B-use reflective liquid crystal panel 50B, the B light remains P-polarized. Thus, the B light again transmits the polarization separation surface of the second polarization beam splitter 57, is converted into the P-polarized light by the color selective phase difference plate 53, transmits the incident side polarization plate 52, is returned to the light source side, and is removed from the projection light.

FIG. 5 shows the panel cooling fan (sirocco fan) 5. In the panel cooling fan 5, an impeller 5d schematically shown by an alternate long and short dash line in FIG. 5, rotates in the casing 5c in the counterclockwise direction (or a dotted arrow direction), the air is drawn from the drawing surface (inlet port) 5a, and blows off the air from the blowoff port 5b. A blowoff channel of the air from the impeller 5d is formed in the casing 5c so that it can spread in the rotating direction of the impeller 5d. The spread of the blowoff channel means an increase of the sectional area of the channel in the radial direction of the fan 5.

This structure of the casing 5c causes a drawing speed distribution of the air in the drawing surface 5a, when the impeller rotates. More specifically, a drawing speed in an area shown by B (second drawing area) is higher than that in an area shown by A (first drawing area). The B area of this embodiment is an area adjacent or close to part having the largest sectional area of the blowoff channel, and a drawing area having the highest speed in the drawing surface 5a.

However, the second drawing area may not be the drawing area having the highest speed, and it is assumed that in two arbitrary areas in the drawing surface, a first drawing area is an area having a smaller drawing speed and a second drawing area is an area having a higher drawing area.

The first lamp cooling fan 15 and the second lamp cooling fan 61 are also sirocco fans, and as the impeller rotates, the drawing surface comes to have the A area and the B area having a higher air drawing speed than the A area, similar to the panel cooling fan 5.

Referring now to FIGS. 3-9, a description will be given of a first embodiment to a third embodiment according to the present invention. In FIGS. 3 to 9, a solid arrow denotes a flow of the air.

First Embodiment

Referring now to FIGS. 3 and 4, a description will be given of the first embodiment. These figures show the liquid crystal panels 50R, 50G, and 50B, the color separation/synthesis optical system 28, and the panel cooling fan 5.

The color separation/synthesis optical system 28 includes the dichroic mirror 46, the G-use incident side polarization plate 47, the first polarization beam splitter 48, the quarter waveplates 49R, 49G, and 49B, the trimming filter 51, the RB-use incident side polarization plate 52, the color selective phase difference plate 53, the B-use exit side polarization plate 54, the dichroic prism 55, the G-use exit side polarization plate 56, and the second polarization beam splitter 57 shown in FIG. 2. The cooling assistance members 59R, 59G, and 59B are located on the back surfaces of the liquid crystal panels 50R, 50G, and 50B.

A cooling air duct is formed outside of the color separation/synthesis optical system 28 in the optical box 31 by fixing the color separation/synthesis optical system 28 onto the prism base 13 shown in FIG. 1, by accommodating it in the optical box 31, and by attaching the optical box lid 27 to the optical box 31.

FIG. 4 is an improved illustration of the structure of FIG. 3. The prism base 13 and the optical element in the color separation/synthesis optical system 28 are fixed onto the fixture member 60.

In addition, the fixture member 60 is arranged opposite to the panel cooling fan 5 with respect to the liquid crystal panels 50R, 50G, and 50B and the color separation/synthesis optical system 28. Thereby, the fixture member 60 serves as an air duct limiting member configured to limit an air duct that cools the liquid crystal panels 50R, 50G, and 50B in the color separation/synthesis optical system 28. The fixture member 60 closes the air duct C that little contributes to cooling of the liquid crystal panels 50R, 50G, and 50B in the color separation/synthesis optical system 28, limits the air duct used to cool each liquid crystal panel, and improves the cooling efficiency of each liquid crystal panel.

Thus, the color separation/synthesis optical system 28 is cooled when the air drawn by the panel cooling fan 5 flows between the optical elements in the color separation/synthesis optical system 28 and in the cooling air duct that is formed along the cooling assistance members 59R, 59G, and 59B in the optical box 31.

The liquid crystal panels 50R, 50G, and 50B are major cooled objects in the color separation/synthesis optical system 28. The optical elements in the color separation/synthesis optical system 28 include a component that is likely to deteriorate due to the heat. The deterioration of the optical element causes a change of an optical characteristic of the optical element, and a deterioration of a projected image. Therefore, the temperature control is necessary for the optical element that is likely to deteriorate due to the heat so that the temperature becomes equal to or smaller than the permissible temperature of the optical element. Among the optical elements, the liquid crystal panel has particularly a low permissible temperature, such as 50°, and the temperature needs to be maintained equal to or smaller than the permissible temperature that guarantees good driving.

Therefore, this embodiment attaches the cooling assistance members 59R, 59G, and 59B that include heat-radiation fins, to the back surfaces of the liquid crystal panels 50R, 50G and 50B. The liquid crystal panels 50R, 50G, and 50B can be cooled by flowing the cooling wind along the fins formed on the cooling assistance members 59R, 59G, and 59B.

The drawing surface 5a of the panel cooling fan 5 is arranged so that it faces the color separation/synthesis optical system 28, the liquid crystal panels 5R, 50G, and 50B, and the cooling assistance members 59R, 59G, and 59B. Moreover, the above B area in the drawing surface 5a of the panel cooling fan 5 is closer to the cooling assistance members 59R and 59B that cool the other liquid crystal panels 50R and 50B than to the cooling assistance member 59G that cools the G-use liquid crystal panels 50G.

The G-use liquid crystal panel 50G and the cooling assistance member 59G correspond to a second cooled part, and the other liquid crystal panels 50R and 50B and the cooling assistance members 59R and 59B correspond to a first cooled part.

In the three liquid crystal panels 50R, 50G, and 50B, due to the optical characteristic of the illumination light, the heating value of the G-use liquid crystal panel 50G is generally higher than that of each of the other liquid crystal panels 50R and 50B. However, the liquid crystal panels 50R, 50G and 50B have permissible temperatures that are equal to each other. Therefore, the cooling air capacity (necessary cooling air capacity) necessary for the G-use liquid crystal panel 50G (cooling assistance member 59G) is larger than the necessary cooling air capacity of each of the other liquid crystal panels 50R and 50B (cooling assistance members 59R and 59B).

Conventionally, in cooling a plurality of cooled parts with the air drawn by one cooling fan, the following structures or countermeasures are adopted so as to distribute a different cooling air capacity among a plurality of cooled parts.

(1) A member that distributes the cooling air capacity is provided between the drawing surface of the cooling fan and a plurality of cooled parts.

(2) A air duct sectional shape used to cool each cooled part is made different in accordance with the necessary cooling air capacity.

(3) A fan is selected or a fan's driving condition is set in accordance with the cooled part having the largest necessary cooling air capacity.

(4) A cooling capacity is adjusted in accordance with a heating value by making different shapes of the cooling assistance members.

However, the above structure (1) arranges the air capacity distribution member near the fan, and thus lowers the efficiency of the fan and increases the noise. The above structure (2) has often difficulties of arbitrarily setting the cooling air duct shape primary because of the optical reason, and is also disadvantage to the miniaturization of the projector. The above structure (3) excessively cools a cooled part having a small necessary cooling air capacity, and causes inefficient cooling as a whole. In addition, when the number of rotations of the fan increases, the noise increases. The above structure (4) needs to prepare the cooling assistance member having different shapes for each cooled part, leading to a cost increase. In addition, a shape of the cooling assistance member is limited near the drawing surface of the fan so as not to shield the cooling air duct.

Accordingly, this embodiment solves the above problems by arranging the B area having a larger drawing speed than the A area in the drawing surface 5a of the above panel cooling fan 5, close to the cooling assistance member 59G for the G-use liquid crystal panel 50G, and obtains the following effects:

[1] The cooling air capacity can be properly distributed among the three cooling assistance members without providing an air capacity distribution member between the drawing surface 5a and the cooling assistance members 59R, 59G, and 59B. Therefore, the three liquid crystal panels 50R, 50G, and 50B can be properly cooled without lowering the fan efficiency. This configuration can lower the noise generated from the panel cooling fan 5, and decrease the number of cooling fans to be used.

[2] A sufficient and necessary cooling air capacity can be secured only by arranging the drawing surface 5a in accordance with the necessary cooling air capacities of the cooling assistance members 59R, 59G, and 59B. Therefore, even when the degree of freedom of shaping of the cooling air duct is low due to the optical reasons, the cooling assistance members 59R, 59G, and 59B can be properly cooled. In particular, even in an attempt to limit an air duct, it is sufficient to only arrange an air duct limiting member (fixture member 60), as shown in FIG. 4, on the upstream side of the cooling assistance members 59R, 59G, and 59B in the drawing direction. Moreover, even when the optical elements are highly densely arranged, the three cooling assistance members 59R, 59G, and 59B can be cooled without increasing the sectional area of the cooling air duct.

[3] Since it is unnecessary to select the panel cooling fan 5 or to set the fan driving condition in accordance with the largest necessary cooling air capacity, the noise can be reduced by selecting a small fan and the projector can be made small.

[4] The cost can be reduced by utilizing a common shape for the cooling assistance members 59R, 59G, and 59B. In addition, since the cooling assistance members 59R, 59G, and 59B need not be made large, the cooling air duct is not shielded and the cooling efficiency can be improved.

Second Embodiment

Referring now to FIGS. 6 and 7, a description will be given of the second embodiment. FIG. 6 shows a cooling structure for the substrate part, and FIG. 7 shows the cooling structure for the substrate part and the lamp 24.

In FIG. 6, the substrate part includes the control substrate 26, the panel driving substrate 29, and the signal receiving substrate 19, which are arranged in parallel in the circuit substrate cover member 30 (30a, 30b, 30c). Since the electronic components mounted on the substrates 26, 29, and 19 have high heating values, and it is necessary to compulsorily cool each substrate.

Therefore, the cooling air ducts are formed along the control substrate 26, the panel driving substrate 29, and the signal receiving substrate 19 in the circuit substrate cover member 30, and the substrates 26, 29, and 19 are cooled when the air drawn by the first lamp cooling fan 15 flows in these cooling air ducts.

Since a heating value of an electric component on each substrate is different, these three substrates 26, 29, and 19 do not have the same necessary cooling air capacity, and the panel driving substrate 29 has the largest necessary cooling air capacity.

This embodiment arranges the drawing surface 15a of the first lamp cooling fan 15 so that it faces the substrates 26, 29, and 19. Moreover, this embodiment arranges the B area on the drawing surface 15a closer to the panel driving substrate (second cooled part) 29 than the other substrates 26 and 19 (first cooled part).

Thereby, a cooling wind having an air capacity larger than that flowing along the substrates 26 and 19 can be flowed along the panel driving substrate 29. Thus, these three substrates 26, 29, and 19 that include the panel driving substrate 29 having the largest necessary cooling air capacity can be properly cooled by avoiding a degradation of the fan efficiency and a noise increase caused because air capacity distribution member is provided.

In addition, the blowoff wind from the first lamp cooling fan 15 cools the lamp 24 and the polarization conversion element 40 shown in FIG. 2 via the air duct formed by the lamp ducts 14 and 16.

In the lamp 24, such as an ultra high-pressure mercury lamp, it is necessary to increase the temperature of the discharge tube 18 in order to increase the operational pressure of the discharge tube 18 and to enable the discharge tube 18 to have a high light emission characteristic. However, an excessively high temperature of the discharge tube 18 cannot guarantee the long-term operation of the lamp 24. In other words, unless the temperature of the discharge tube 18 is maintained in a proper range, a devitrification phenomenon, such as blacking and whiting, may occur and the operation becomes unstable. Therefore, proper cooling of the discharge tube 18 is necessary.

When two or more cooled parts are arranged in the fan's blowoff direction and another direction, prior art use the following structures for cooling in accordance with the necessary cooling air capacity:

(1) A dedicated cooling fan is provided for each cooled part.

(2) The cooling wind is led to each cooled part through a duct.

However, the above structure (1) makes an apparatus large and increases the cost. The above structure (2) arranges the duct in the direction different from the blowoff direction of the fan, and thus makes the product large.

On the other hand, this embodiment solves the above problems and provides the following effects:

[1] The substrate part and the lamp 24 can be cooled without providing a dedicated cooling fan to each of them. Therefore, the number of fans to be used can be reduced, and the projector can be made small or inexpensive.

[2] The projector can be made small since the duct structure becomes simple.

A structure that cools separate cooled parts by using the drawn wind by the fan and the blowoff wind from the fan needs to improve the cooling efficiency so as to handle the high-density arrangement of the components in the apparatus and an increased heating value. This embodiment arranges the drawing surface of the first lamp cooling fan 15 as the centrifugal fan in accordance with the necessary cooling air capacity of the cooled part to be cooled by the drawn wind, and can improve the cooling efficiency of the drawn wind.

Third Embodiment

Referring now to FIGS. 8 and 9, a description will be given of a third embodiment. These figures show a cooling structure around the lamp.

The lamp 24, the lamp cord 6, the lamp ducts 14 and 16, the lamp holder 23, and the polarization conversion element 40 shown in FIG. 2 are provided around the lamp. The blowoff wind from the first lamp cooling fan 15 cools the lamp 24 (in particular, discharge tube 18) and the polarization conversion element 40 via the lamp ducts 14 and 16. The drawn wind to the second cooling fan 61 cools the lamp cord 6 and the light emitting tube 18.

The lamp 24 has a very large heating value, and the lamp cord 6 becomes a high temperature due to its influence. The lamp cord 6 needs to be compulsorily cooled so as to satisfy the heatproof temperature of the cord. However, as described in the second embodiment, cooling of the discharge tube 18 is also necessary, and the necessary cooling air capacity of the discharge tube 18 is higher than that of the lamp cord 6.

The heating value in the housing increases as the project becomes smaller and more sophisticated. As a result, the exhaust wind to the outside of the housing becomes high temperature, and it is necessary to weigh the exhaust direction of the exhaust wind so as not to cause a user around the projector to feel uncomfortable.

On the other hand, the degree of arrangement freedom of the cooling fan can be low due to the space limitation in the housing, and it is conceivable that a high load is applied to the cooling fan, for example, by exhausting the exhaust air from the cooling fan arranged at component dense part to the outside of the housing. In this case, it is suitable to use a centrifugal fan that has strong exhaust directivity and has a low reduction of the fan efficiency even under a high load.

In addition, near a component having a large heating value, another component can require compulsory cooling due to the influence of the heat. In this case, efficient use of the fan is effective to cool both the component having the large heating value and the nearby component that needs the compulsory cooling.

Therefore, this embodiment arranges the drawing surface 61a of the second lamp cooling fan 61 so that it faces the lamp 24 and the lamp cord 6, as shown in FIG. 8. Moreover, this embodiment arranges the B area of the drawing surface 61a closer to the lamp (second cooled part) 24 than to the lamp cord (first cooled part) 6. More specifically, the B area is arranged opposite to the exhaust surface of the air that has cooled the discharge tube 18 in the lamp 24. In addition, the A area is arranged on the side of the lamp cord 6.

Thereby, the discharge tube 18 having the largest can be properly cooled and the lamp cord 6 can also be sufficiently cooled while a reduction of the fan efficiency and a noise increase are prevented because no air capacity distribution member is provided.

The exhaust air (blowoff wind) having strong directivity from the second lamp cooling fan 61 can be exhausted in an arbitrary direction in the projector by using a duct, etc.

Fourth Embodiment

While each of the above embodiments discusses an application of the cooling structure using the centrifugal fan to the projector, a similar cooling structure can be applied to another electric apparatus.

For example, in an image pickup apparatus, such as a video camera, the preset invention is applicable to cooling of an electronic component such as an operation processing element, e.g., a CPU, and an image sensor, e.g., a CCD sensor, or an electric circuit substrate mounted with the electronic component. In addition, the present invention is applicable to cooling of a variety of electronic components and electric circuit substrate in the personal computer.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-027707, filed on Feb. 7, 2008, which is hereby incorporated by reference herein in its entirety.

What is claimed is:

1. An electric apparatus comprising:
   a centrifugal fan that includes an impeller in a casing, and configured to draw air when the impeller rotates in the casing, and to have a blowoff channel of the air from the impeller in the casing, which spreads in a rotating direction of the impeller; and
   a first cooled part and a second cooled part that has a necessary cooling air capacity larger than that of the first cooled part, the first cooled part and the second cooled part being cooled by the air drawn by the centrifugal fan,
   wherein the casing comprises a drawing surface of the centrifugal fan having a first drawing area and a second drawing area that has a drawing speed higher than that of the first drawing area when the impeller rotates, wherein the drawing surface faces the first and second cooled parts, and wherein the second drawing area is closer to the second cooled part than to the first cooled part and wherein the drawing surface is arranged between the impeller and the first and second cooled parts.

2. The electric apparatus according to claim 1, wherein the second drawing area is an area having the highest drawing speed in the drawing surface.

3. The electric apparatus according to claim 1, wherein the electric apparatus is an image projection apparatus configured to project light onto a projected surface from a plurality of image modulation elements configured to modulate luminous fluxes having different wavelength regions, and wherein the second drawing area is closer to one of the plurality of image modulation elements, which one has the largest necessary cooling air capacity, than to another one of the plurality of image modulation elements.

4. The electric apparatus according to claim 3, further comprising:
   a color separation/synthesis optical system configured to separate light from a light source into luminous fluxes having different wavelength regions, and to synthesize the luminous fluxes from the plurality of image modulation elements; and an air duct limiting member configured to limit an air duct configured to cool the plurality of image modulation elements in the color separation/synthesis optical system, wherein the air duct limiting member is arranged opposite to the centrifugal fan with respect to the plurality of image modulation elements and the image separation/synthesis optical system.

5. The electric apparatus according to claim 1, wherein the electric apparatus is an image projection apparatus configured to modulate light from a light source through a plurality of image modulation element, and to project the light onto a projected surface, and further comprises a plurality of electric circuit substrates that includes a modulation element driving substrate configured to drive the plurality of image modulation elements, and wherein the second drawing area is closer to the modulation element driving substrate than to the other electric circuit substrates.

6. The electric apparatus according to claim 1, wherein the electric apparatus is an image projection apparatus configured to modulate light from a light source supplied with power through a cord by using an image modulation element and to project the light onto a projected surface, wherein the second drawing area is closer to the light source than to the cord.

* * * * *